(12) United States Patent
Döhrer

(10) Patent No.: US 6,245,154 B1
(45) Date of Patent: Jun. 12, 2001

(54) PROCESS AND APPARATUS FOR REMOVING LIQUID IMPURITIES ADHERING TO A WORKPIECE

(76) Inventor: Klaus Döhrer, Goldbreite 31, D-58730 Fröndenberg-Ardey (DE)

( * ) Notice: Subject to any disclaimer, the term of this patent is extended or adjusted under 35 U.S.C. 154(b) by 0 days.

(21) Appl. No.: 09/242,775

(22) PCT Filed: Aug. 21, 1997

(86) PCT No.: PCT/EP97/04531

§ 371 Date: Feb. 22, 1999

§ 102(e) Date: Feb. 22, 1999

(87) PCT Pub. No.: WO98/07531

PCT Pub. Date: Feb. 26, 1998

(30) Foreign Application Priority Data

Aug. 22, 1996 (DE) ................................. 196 33 771
Apr. 24, 1997 (DE) ................................. 197 17 171

(51) Int. Cl.[7] ................. A47L 5/38; B08B 5/04; B08B 7/02; B08B 6/00; B08B 9/20
(52) U.S. Cl. ................. 134/1; 134/10; 134/21; 134/33; 134/25.4; 15/1.51; 15/303; 15/308; 15/313

(58) Field of Search ................... 134/1, 10, 21, 134/33, 25.4; 15/303, 1.51, 308, 313

(56) References Cited

U.S. PATENT DOCUMENTS

| 3,989,537 | 11/1976 | Sickmeier | 134/1 |
| 4,381,577 | 5/1983 | Boye et al. | 15/304 |
| 5,145,297 | 9/1992 | McGrath, Jr. | 15/1.51 |
| 5,882,524 | * 3/1999 | Storey et al. | 210/712 |

FOREIGN PATENT DOCUMENTS

WO 96/24462  8/1996 (GB).

* cited by examiner

Primary Examiner—Zeinab El-Arini
(74) Attorney, Agent, or Firm—Sonnenschein Nath & Rosenthal

(57) ABSTRACT

This invention concerns a process for removing liquid and/or solid impurities adhering to a workpiece (6), in particular oils, emulsions and/or chips, the workpiece (6) being secured in an apparatus and made to oscillate. The new process is characterized in that at least one nozzle (4) simultaneously applies suction to the workpiece (6) by means of a stream of directed air. Moreover, the invention also concerns devices for carrying out this process.

11 Claims, 2 Drawing Sheets

PROCESS AND APPARATUS FOR REMOVING LIQUID IMPURITIES ADHERING TO A WORKPIECE

This is a national stage application of PCT/EP97/04531 filed Aug. 21, 1997.

The invention relates to a process for removing liquid impurities in the form of oils and emulsions adhering to a workpiece with the oils and emulsions possibly containing solid contaminants, in particular chips removed from the workpiece, wherein the workpiece is secured to an apparatus and made to vibrate and an associated apparatus for carrying out the described process comprising a device for securing a workpiece with the device arranged at a base-plate, with liquid impurities like oils and emulsions which possibly may contain solid contaminants, in particular chips, adhering to the workpiece, at least one vibration generator for making the workpiece vibrate.

Workpieces like metallic machine parts, in particular after machining and prior to the next operational step, or prior to the mounting or shipping, are washed from adhering liquids in form of oils or emulsions, and other impurities like adhering chips and grinding dust. According to the state of the art, for this purpose different processes are in use.

In a first process which is widely used and known from practical experience the workpiece is washed in a washing device in a suitable mostly heated washing liquid which often contains solvents, is flushed and subsequently dried and if necessary is sprayed with an appropriate agent, e.g., with a thin layer of oil, to protect it against corrosion. It is disadvantage of this process and this apparatus that the energy requirement is very high, which is at the one hand necessary for heating the washing liquid, and at the other hand is required for the necessary drying of the workpieces by heating. Furthermore for environmental reasons a labor-intensive and expensive treatment and cleaning of the washing liquid is necessary.

From U.S. Pat. No. 3,989,537 a process and a device is known for cleaning engine blocks and similar workpieces by vibration to remove casting and machining swarf. According to this known process, the workpiece is made to vibrate in resonant torsional vibrations about a longitudinal axis. The workpiece may simultaneously be rotated in order to remove the swarf out of the cavities of the workpiece, with the swarf loosened by vibrations from the walls of the workpiece. Furthermore, a vibration cleaning unit is described comprising an elastically supported rotatable frame for clamping and rotating an engine block. At the engine block a small excentric vibrator is attached which may be driven by a motor and which vibrates the engine block in resonant vibrations.

It is a disadvantage of this known state of the art that only workpieces may be cleaned which are completely or at least almost dry. Workpieces with adhering liquids, i.e., oil, may not or not completely be cleaned in this way; as only by the generated vibrations, the adhering liquids and the bound dirt particles may not be removed from the workpiece.

U.S. Pat. No. 4,381,577 describes an apparatus for the removal of dirt particles out of drill holes or cavities in workpieces. For this purpose the workpiece is made to vibrate while simultaneously blowing air through the drill holes or the cavities, whereby dirt particles positioned there are to be removed out of the interior of the workpiece.

Hereby a removal of dirt particles and also liquids out of the interior of workplaces is possible, however, the removed particles and liquids are blown into the environment in an uncontrollable fashion. This results in a contamination of the environment which is not desired, or even harmful.

U.S. Pat. No. 5,145,297 illustrates an apparatus and a process for removing dust and particle-like material from a machined workpiece by means of suction. In an embodiment of the associated apparatus, a suction line with a suction nozzle at the one end thereof is provided, wherein the suction nozzle comprises spacers at the front side thereof by means of which the suction nozzle may contact the workpiece to be cleaned. Therein it is provided that the suction nozzle is approaching the workpiece from below. Furthermore this known apparatus comprises a blowing nozzle built into the suction nozzles with the blowing nozzle blowing ionized gas by means of which an electrostatic charge of the particle-like material to be removed is neutralized and made inert. Additionally, a vibration generator may be placed at the upper side of the workpiece opposing the suction nozzle in order to support the cleaning of the workpiece.

It is a disadvantage of this known state of the art that the apparatus and the process is only suitable for removing dry contaminants from the workpiece. For the removal of liquid contaminants, in particular oils and emulsions which have a high viscosity and a strong adherance, this apparatus and the corresponding process is not suitable. The suction nozzle is not adapted to the contour of the workpiece, whereby only such contaminants may be removed from the workpiece which consist of particles easy to be removed and are only clinging to the workpiece with a small adhesive force. By the fact that the vibration generator is only loosely placed onto the workpiece no defined vibrations in the workpiece are guaranteed, moreover the vibrations generated in the workpiece are more at random and may not be reproduced.

Finally, a process and an apparatus for removing chips from machined workpieces is known from WO 96/24462. Therein the workpiece is arranged at a carrier, and the carrier is made to vibrate such that the workpiece, for a short period of time, is lifted from the carrier, and subsequently hits the carrier under the influence of gravity.

Also this process and the associated apparatus is only suitable for the removal of dry contaminants from the workpiece, like the chips mentioned, liquid contaminants, in particular oils and emulsions, may not be removed from the workpiece. Additionally to the cleaning of the workpiece by vibration, before or after washing process may follow wherein the washing process is accomplished by means of liquids or gases like air. The washing by means of liquids leads to the drawbacks mentioned above. In a washing process by means of gas or air which, for practical reasons, means a blowing of the workpiece, a not-controlled distribution of chips and other contaminants in the environment may result which is not desired.

SUMMARY OF THE INVENTION

It is the object of the present invention to provide a process and an associated apparatus wherein an effective cleaning of workpieces is possible with liquid contaminants in the form of oils and emulsions adhering thereto, wherein solid contaminants may be contained without danger to the environment, with a low energy consumption and at low cost.

The object of the process-related part is attained by generating vibrations with a vibration frequency of between 20 and 100 $H_z$, generating vibrations at a part of the apparatus securing the workpiece. Simultaneously subjecting the impurities to suction at the workpiece by an airstream guided through at least one nozzle adapted to the shape of the workpiece, and separating the removed liquid and solid impurities from each other by suitable means and reusing or applying each to a new use.

In the process according to the invention, the advantageous effect is created that liquid contaminants in the form of oils and emulsions may, also be effectively removed by suction. This surprising effect obviously is based thereon that by the vibrations the adhesive force of the liquids to be removed and eventually the particles contained therein, is strongly reduced at the workpiece. Therein the energy requirement for the cleaning and the operation time per workpiece is reduced. Therein it is preferably provided that the vibrations are generated with a vibration frequency of between 20 and 100 Hz. As a surprise, it has been found that particularly in this frequency range, a most effective mobilizing of the liquids or mixtures of liquid and solid contaminants adhering to the workpiece is attained. It is a further advantage of this process according to the invention that the vibrations in the above frequency range to be generated with a relative small technical effort and a low energy demand, which positively influences the grade of efficiency of the process. Therein that the vibrations are generated in a part of the device securing the workpiece, the total surface of the workpiece except a very small area required for the securing is not subject to suction, wherein an impairing of the suction process is excluding. The guidance of the airstream for the suction of the contaminants by at least one nozzle adapted to the form of the workpiece, guarantees that even with a relatively small vacuum, sufficiently high air velocities occur in the areas of the workpiece surface leading to an effective removal even of sticking and adhering contaminants in form of oils and emulsions. Finally, the process according to the invention guarantees that dangers to the environment are avoided, more so it is guaranteed, that the removed liquid and solid contaminants are separated from each other and may be reused or applied to a new use which reduces the waste amount and saves cost.

Advantageously it is provided that the vibrations are generated in a frequency such that the workpiece vibrates in a standing wave and that suction is supplied at the workpiece only at the nodal points of the standing wave. Thereby the liquid droplets and dirt particles will collect at the nodes and are removed by suction there. Hereby a further reduction of the energy requirement is attained wherein advantageously the size and/or number of the nozzles may be reduced.

For rotatably clamped workpieces it is advantageously provided that additionally and simultaneously the workpiece is rotated about an axis A in a clamping device forming a part of the apparatus. This process may be particularly advantageously applied when a multitude of rotation-symmetrical or non-rotation-symmetrical, however, rotatably clampable workpieces have to be cleaned one after the other.

In particular, a frequency range for the vibration is preferred between 48 and 55 Hz, as in this range an especially good level of efficiency may be attained.

Furthermore, the process according to the invention provides that accelerations are exerted onto the workpiece by vibrations up to maximal 25 g wherein a range of the accelerations between 8 and 15 g is particularly preferred. It is an advantage that the quoted acceleration values at the one hand are sufficiently large to mobilize the liquids or liquid solid contaminant mixtures clinging to the workpiece in relation to the workpiece and thus to facilitate the removal by suction, however, that they at the other hand are small enough to avoid damage to the workpiece even by the accelerations occuring.

As different workpieces, comprise different vibration features, and as different liquid and/or solid contaminants react differently to the applied vibrations, for practical reasons before a serial cleaning of workpieces a test is made on a single test specimen to optimize the vibration parameters quoted above, which then may be maintained for the serial cleaning of a plurality of identical workpieces with nearly identical contaminations adhering thereto. In this manner a low cost integration of the process and apparatus used thereto in production lines is possible, e.g., in motor car production, in particular for engine blocks. The vibration generators used for practical reasons are adjustable at least within the quoted frequency ranges, and for attaining the required preferred acceleration values, are adjustable and controllable in a suitable degree regarding the amplitude or the applied vibration energy.

Beside mechanical vibration generators with rotating or linear moving excentric masses, electromagnetical or piezo-electrical or pneumatical or hydraulical vibration generators may also be used. The selection for the single case of the best suitable vibration generator is made by the expert and amoung others depends on the environmental factors at the site of the process and the tolerable technical effort and the like marginal conditions.

A device is disclosed for attaining the device-related part of the object. The apparatus enables to carry out the process according to the invention with a high operational safety and with good cleaning results at low operational cost.

An embodiment of the apparatus according to the invention for rotatably clampable workpieces is disclosed wherein the device for securing the workpiece comprises two receiving mandrels rotatably supported along a rotation axis wherein at least one of the mandrels is displaceable in the direction of the axis, and wherein at least one of the receiving mandrels is rotatably driven.

In an embodiment of the apparatus described above it is provided that a vibration generator is attached at a bearing housing of one of the two receiving mandrels. Alternately it is provided that one vibration generator is attached at each of the bearing housings of the two receiving mandrels.

In a further embodiment it is provided that the two receiving mandrels are rotatably supported in a generally U-shaped vibration fork in each of the U-legs thereof, that a clamping cylinder is arranged at a projection projecting transversely to one of the U-legs, that the vibration fork is elastically supported at the baseplate by means of four feet and that a vibration generator is arranged at the vibration fork. Therein advantageously the vibration fork is made to vibrate with only one vibration generator, with the vibration fork transferring its vibration onto the workpiece, wherein the vibration fork is elastically supported at the baseplate.

For generating a standing wave within the workpiece, a definite frequency of the vibration is required. As naturally differently shaped workpieces have to be processed, the frequency is adapted to the workpiece which is possible by relatively simple tests. The vibrations may be generated in one direction, however, they may also be at a circular path or in several directions.

Regarding the environmental protection, the present invention offers advantages, as the sucked-off liquids and solid particles may again be separated by known devices like oil separators or filters, and may be recycled to another or new use. There is no waste which has to be especially done away with or particularly treated. No solvents need to be used and there is no danger connected thereto.

For practical reasons the at least one nozzle is adapted to the shape of the workpiece, or may be adapted by adjustable nozzle parts in order to guarantee high air velocities at the surface of the workpiece.

BRIEF DESCRIPTION OF THE DRAWING

Two examples of devices according to the invention are now further explained referring to a drawing. The drawing illustrates in FIG. 1 a first embodiment of a device incorporating the principles of the present invention in a perspective view wherein the nozzles and also the receiving mandrels are moved away from a workpiece, and in FIG. 2 a second embodiment of such a device also in a perspective view.

DETAILED DESCRIPTION OF THE PREFERRED EMBODIMENTS

Figure 1:
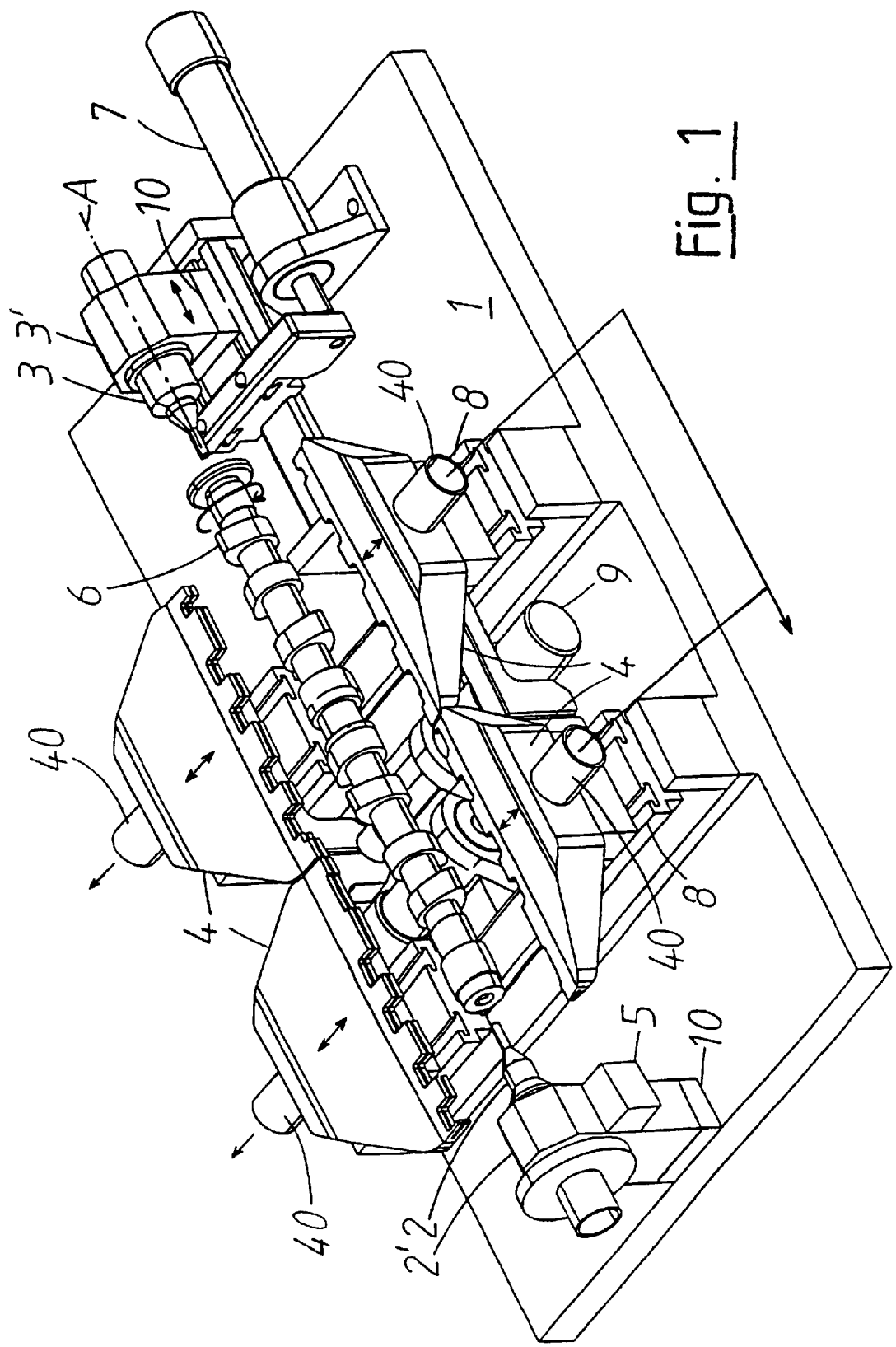

Referring to FIG. 1, the device comprises a rectangular base-plate 1 whereat at the left side, a bearing housing 2' is arranged by means of an elastic intermediate plate 10, wherein in the bearing housing 2' a receiving mandrel 2 is rotatably supported. This receiving mandrel 2 is rotationally drivable, wherein the rotatory drive, e.g., an electrical motor, is not illustrated. At the right side of the base-plate 1 a bearing housing 3' is arranged, wherein a receiving mandrel 3 is rotatably supported. The two receiving mandrels 2 and 3 are positioned at an axis A. The receiving mandrel 3 with the bearing housing 3' is displaceably supported in direction of the axis A at the base-plate 1 through a further elastic intermediate plate 10, wherein the displacing movement may be attained by a first feeding unit 7. The first feeding unit 7 e.g., is a pneumatic or hydraulic piston-cylinder-unit.

A workpiece 6 may be clamped between the two receiving mandrels 2 and 3, wherein in the example given it is a camshaft. When the two receiving mandrels 2 and 3 are engaged with the workpiece 6, this workpiece may be rotatably driven as it is illustrated by the arrow at the right end of the workpiece.

At both sides of the axis A in total four suction nozzles 4 are arranged with the mouthpieces thereof adapted to the form of the workpiece 6. According to the illustrated double arrows, the nozzles 4 may be displaced transversely to the axis A, for which reason two facing nozzles 4 each are supported at a slide 8. The pushing movement is attained by a second feeding unit 9 which is arranged between the two slides 8 and may be also a pneumatic or hydraulic piston-cylinder-unit.

In FIG. 1 the nozzles 4 have been moved away from each other for inserting the workpiece; for the suction they are brought close to the surface of the workpiece 6 by the second feeding unit 9. In the simplest case this feeding unit 9 may be operated manually, alternately a mechanical control, by means of templates, or an electronic control, by means of stored control data, may be provided in order to move the nozzles 4 into their optimal suction positions independent from the turning angle. The air movement is indicated by arrows at the associated flexible pipes 40 which are only partly illustrated. The pipes 40 lead to a suction device which is known as such. In the flow path, for practical reasons, separators for liquids and chips and other solid contaminants are arranged in a fashion known as such.

In the present example a vibration generator 5 s secured to the bearing housing 2', wherein the electrical feeding lines are not illustrated. When the vibration generator 5 is activated, the two bearing housings 2', 3' will vibrate together with the receiving mandrels 2, 3 and the workpiece 6. The other parts of the device which are separated by the intermediate plate 10 are substantially free from vibrations.

Figure 2:
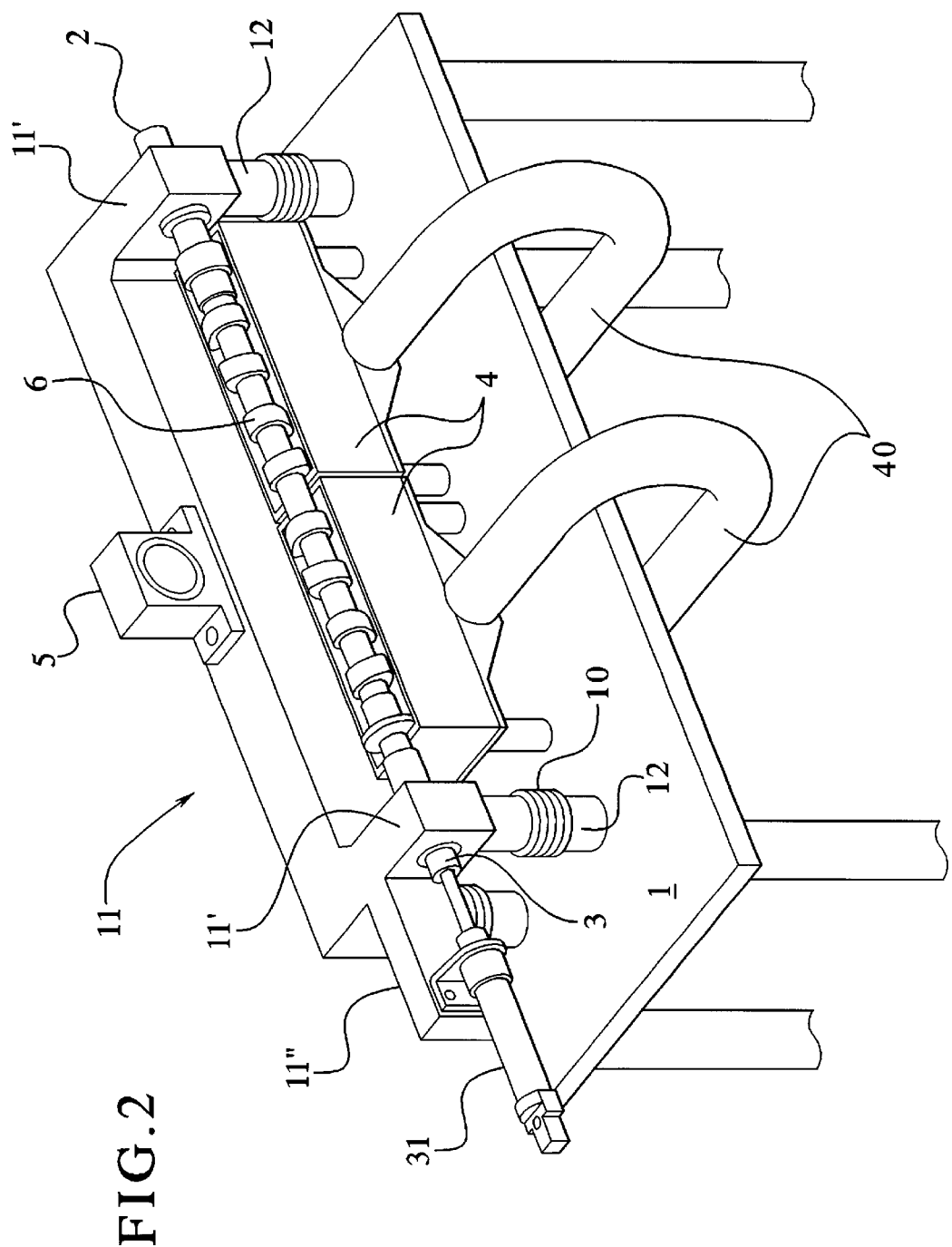

FIG. 2 illustrates, in a perspective view, a second embodiment of the device. At an also rectangular baseplate 1 a generally U-shaped vibrating fork 11 in horizontal extension is arranged at four feet 12 wherein each of the four feet 12 comprises an elastic intermediate plate 10. The feet 12 and the corresponding intermediate plates 10 in the present example are designed with a circular cross-section.

The vibrating fork 11 comprises two U-legs 11' which each comprise an aligned drill hole wherein the receiving mandrels 3 and 2 are rotatably supported. The receiving mandrels 2 and 3 will receive a workpiece 6 between them which is also in this case designed as a camshaft. For clamping the workpiece 6, a clamping cylinder 31 is provided which may be actuated hydraulically or pneumatically, and at which a projection 11" is attached which projects transversely to the left leg 11' of the vibrating fork 11.

At the middle web of the vibrating fork 11 a vibrating generator 5 is arranged.

Furthermore in FIG. 2, two nozzles 4 are visible each of which are connected with a suction device (not illustrated) through a pipe 40. The nozzles 4 each are attached at feet at the base-plate 1.

The base-plate 1 is arranged with four legs like a table.

In this embodiment, when the vibration generator 5 is activated, the vibrating fork 11 will vibrate together with the attached projection 11", and the clamping cylinder 12, and the clamped workpiece 6.

By the cooperation of vibrations and a suction process an effective and economical cleaning of many kinds of workpieces is possible according to the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A process for removing liquid impurities in a form of oils and emulsions adhering to a workpiece having a non-planar shape with the oils and emulsions containing solid contaminants, in particular chips removed from the workpiece, wherein the workpiece is secured to an apparatus and made to vibrate, said process comprising the steps:

generating vibrations with a vibration frequency of between 20 and 100 Hz;

generating the vibrations at a part of the apparatus securing the workpiece;

simultaneously subjecting the impurities to suction at the workpiece by an air-stream guided through at least one nozzle adapted to the non-planar shape of the workpiece; and separating the removed liquid and solid impurities from each other and reusing or applying each to a new use.

2. A process according to claim 1, wherein the vibrations are generated at a frequency such that the workpiece will vibrate in a standing wave, and that wherein the suction is applied to the workpiece only at nodal points of the standing wave.

3. A process according to claim 1, including a further step of additionally and simultaneously rotating the workpiece about an axis in a clamping device forming a part of the apparatus.

4. A process according to claim 1, wherein the vibrations are generated with a frequency of about 48 to 55 Hz.

5. A process according to claim 1, including a step of exerting accelerations of up to 25 g at maximum onto the workpiece by the vibration.

6. A process according to claim 5, wherein accelerations of between 8 to 15 g are exerted onto the workpiece by the vibration.

7. An apparatus for removing impurities in a form of oils and emulsions adhering to a workpiece, the workpiece having a non-planar shape, with the oils and emulsions containing solid contaminants, in particular chips removed from the workpiece, comprising a device for securing the workpiece, with the device arranged at a base-plate, and at least one vibration generator for making the workpiece vibrate, the apparatus comprising:

an elastic support positioned between the device and the base-plate;

the vibration generator being operably connected to the device;

at least one nozzle being provided which is adapted to the non-planar shape of the workpiece;

a suction device;
said nozzle being connected to said suction device and being positionable at selectable positions at the base-plate; and a separating device positioned downstream of said nozzle wherein the removed liquid and solid impurities are separated from each other.

8. An apparatus according to claim 7, wherein the device for securing the workpiece comprises two receiving mandrels rotatably supported along an axis, wherein at least one of the receiving mandrels is displaceable in a direction of the axis, and wherein at least one of the receiving mandrels is rotatably driveable.

9. An apparatus according to claim 8, wherein the vibration generator is arranged at a bearing housing of one of the two receiving mandrels.

10. An apparatus according to claim 8, wherein the vibration generator is arranged at each of two bearing housings of the two receiving mandrels.

11. An apparatus according to claim 8, wherein the two receiving mandrels are rotatably supported each in U-legs of a U-shaped vibrating fork, a clamping cylinder is arranged at a projection protruding transversely to one of the U-legs, the vibrating fork is elastically supported at the base-plate by means of four feet, and the vibration generator is arranged at the vibrating fork.

* * * * *